(12) United States Patent
Shiohara

(10) Patent No.: US 9,848,131 B2
(45) Date of Patent: Dec. 19, 2017

(54) IMAGING DISPLAY DEVICE AND CONTROL METHOD THEREOF

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/808,406

(22) Filed: Jul. 24, 2015

(65) Prior Publication Data

US 2016/0044221 A1 Feb. 11, 2016

(30) Foreign Application Priority Data

Aug. 11, 2014 (JP) ................................ 2014-163281
May 22, 2015 (JP) ................................ 2015-104667

(51) Int. Cl.
*H04N 5/238* (2006.01)
*H04N 5/232* (2006.01)
*H04N 5/345* (2011.01)
*H04N 9/04* (2006.01)

(52) U.S. Cl.
CPC .......... *H04N 5/238* (2013.01); *H04N 5/23293* (2013.01); *H04N 5/3452* (2013.01); *H04N 5/3456* (2013.01); *H04N 5/3458* (2013.01); *H04N 9/045* (2013.01)

(58) Field of Classification Search
CPC .... H04N 5/238; H04N 5/3452; H04N 5/3458; H04N 5/23293; H04N 5/3456; H04N 9/045
See application file for complete search history.

(56) References Cited

U.S. PATENT DOCUMENTS

| | | | | |
|---|---|---|---|---|
| 2007/0211153 | A1* | 9/2007 | Uchida | H04N 5/23293 348/231.99 |
| 2008/0199168 | A1 | 8/2008 | Sakaguchi | |
| 2009/0167925 | A1* | 7/2009 | Murata | H04N 5/2628 348/345 |
| 2009/0180000 | A1* | 7/2009 | Shiraishi | H04N 5/2628 348/223.1 |
| 2010/0177219 | A1* | 7/2010 | Murata | H04N 5/23209 348/241 |
| 2011/0292236 | A1* | 12/2011 | Shiohara | H04N 5/357 348/222.1 |

(Continued)

FOREIGN PATENT DOCUMENTS

| | | |
|---|---|---|
| JP | 2007-005912 A | 1/2007 |
| JP | 2007-243615 A | 9/2007 |

(Continued)

*Primary Examiner* — Jason Flohre
(74) *Attorney, Agent, or Firm* — Global IP Counselors, LLP

(57) ABSTRACT

An imaging display device includes a lens unit, an imaging unit that outputs an imaging signal obtained by imaging, an image signal generating unit that generates an image signal by performing image processing in accordance with optical properties of the lens unit, a display unit that displays an image based on the image signal, and a timing control unit that controls the phase difference from the frame start of the imaging signal to the frame start of the image signal so as to be changed in accordance with a predetermined time required for the image processing.

8 Claims, 13 Drawing Sheets

(56) References Cited

U.S. PATENT DOCUMENTS

| | | | | |
|---|---|---|---|---|
| 2014/0022418 A1* | 1/2014 | Kano | ................ | H04N 5/23203 |
| | | | | 348/241 |
| 2014/0232927 A1* | 8/2014 | Kawai | ............... | H04N 5/23212 |
| | | | | 348/347 |
| 2015/0215520 A1* | 7/2015 | Ishihara | ............ | H04N 5/23212 |
| | | | | 348/349 |

FOREIGN PATENT DOCUMENTS

| JP | 208-085772 A | 4/2008 |
|---|---|---|
| JP | 2008-203454 A | 9/2008 |

\* cited by examiner

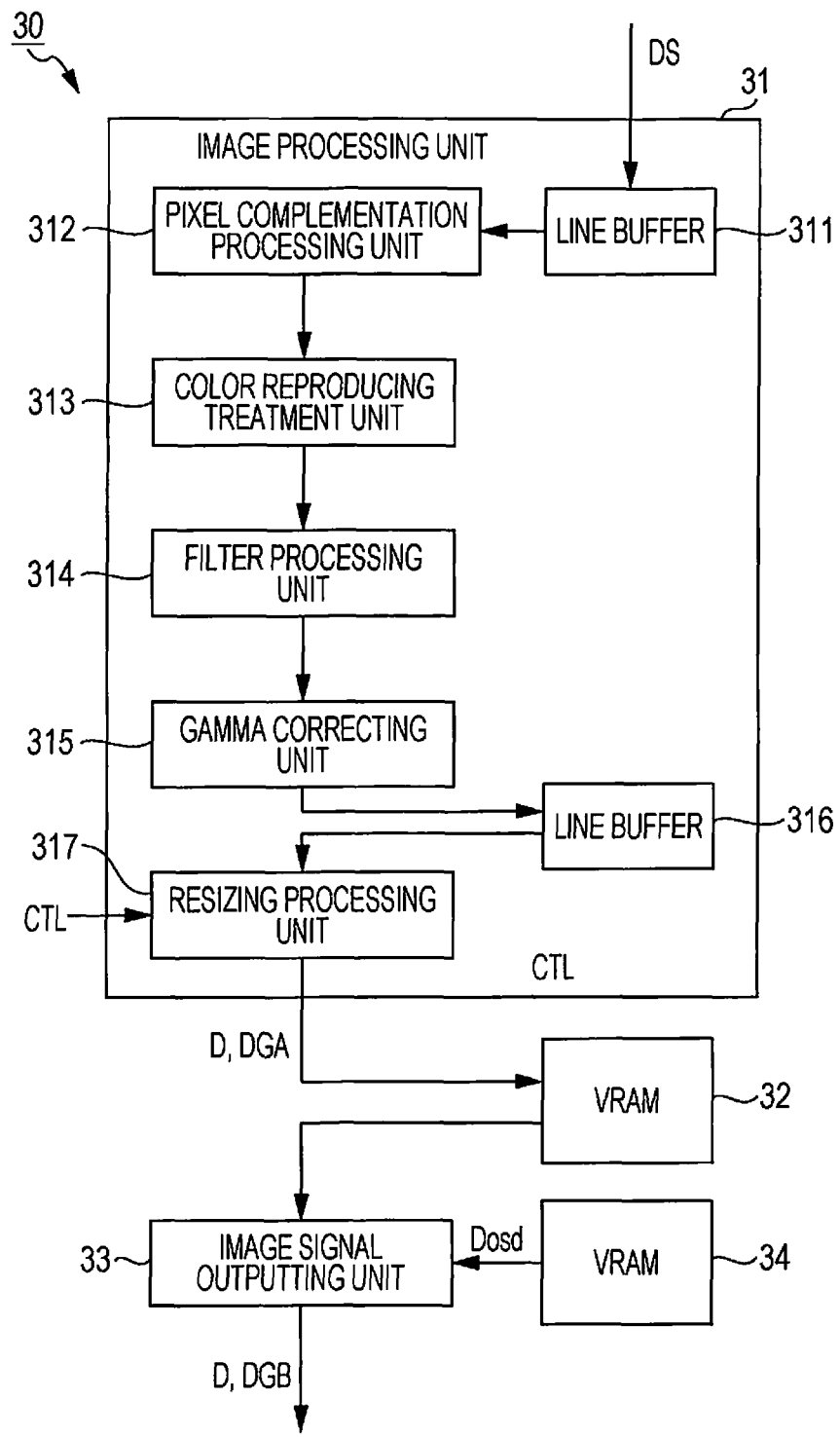

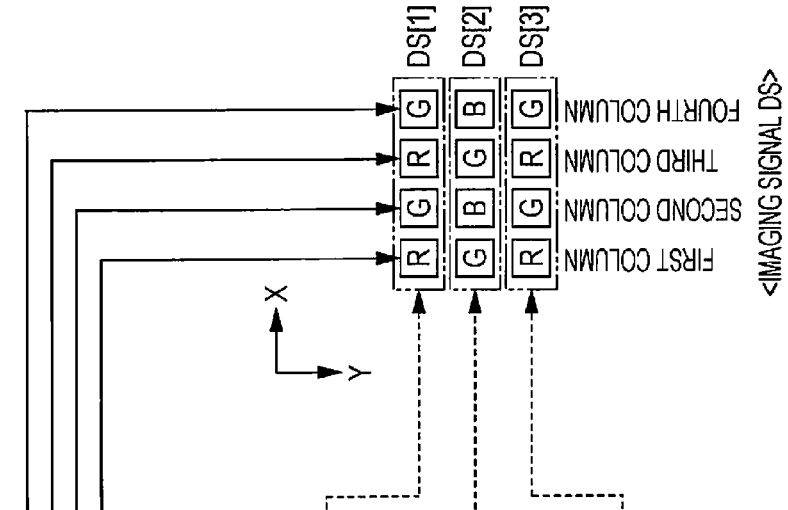
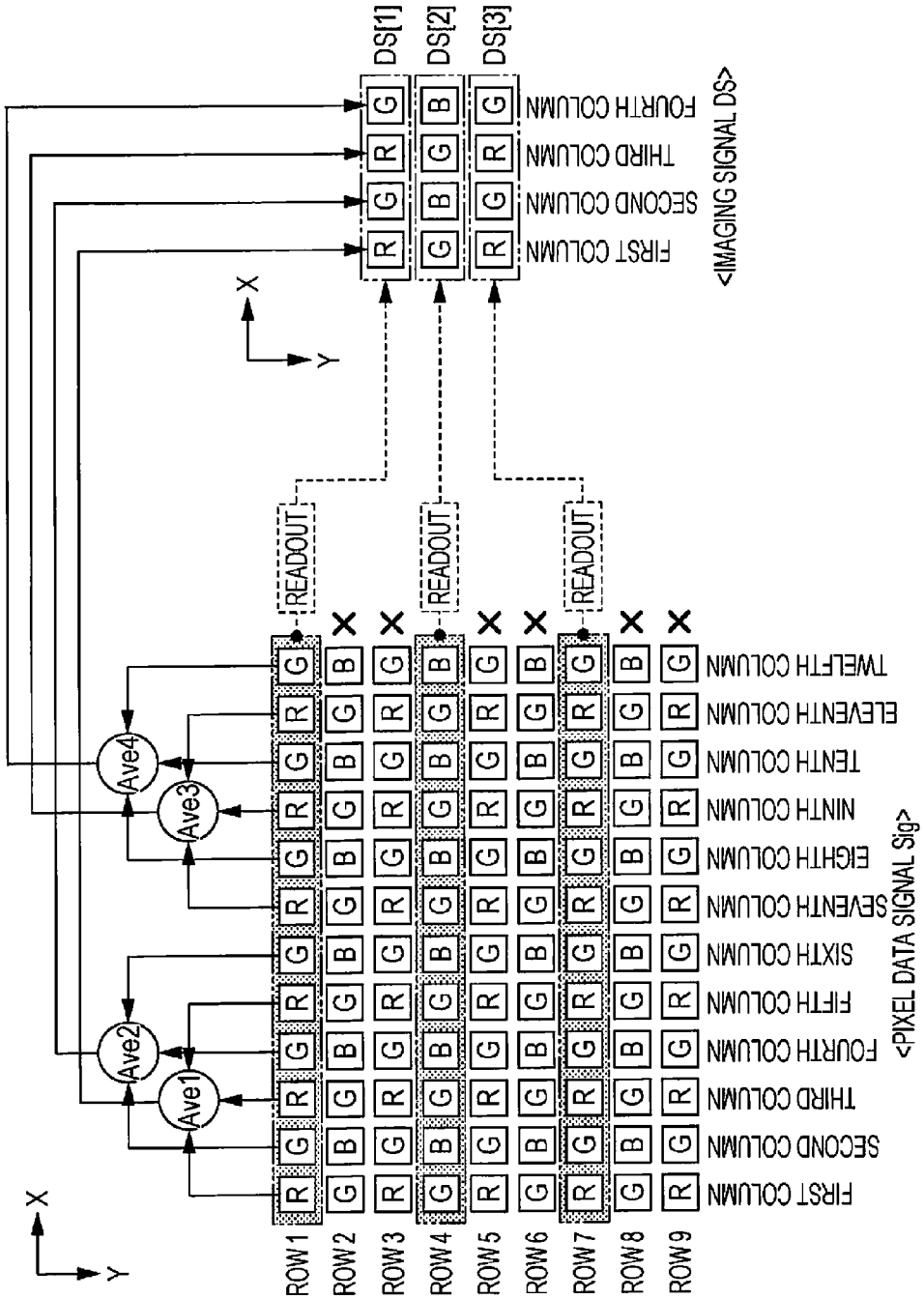

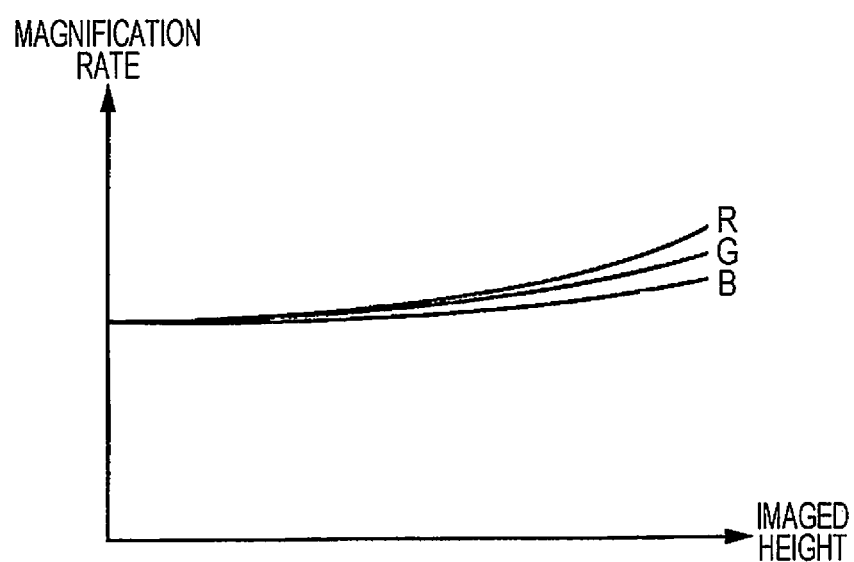

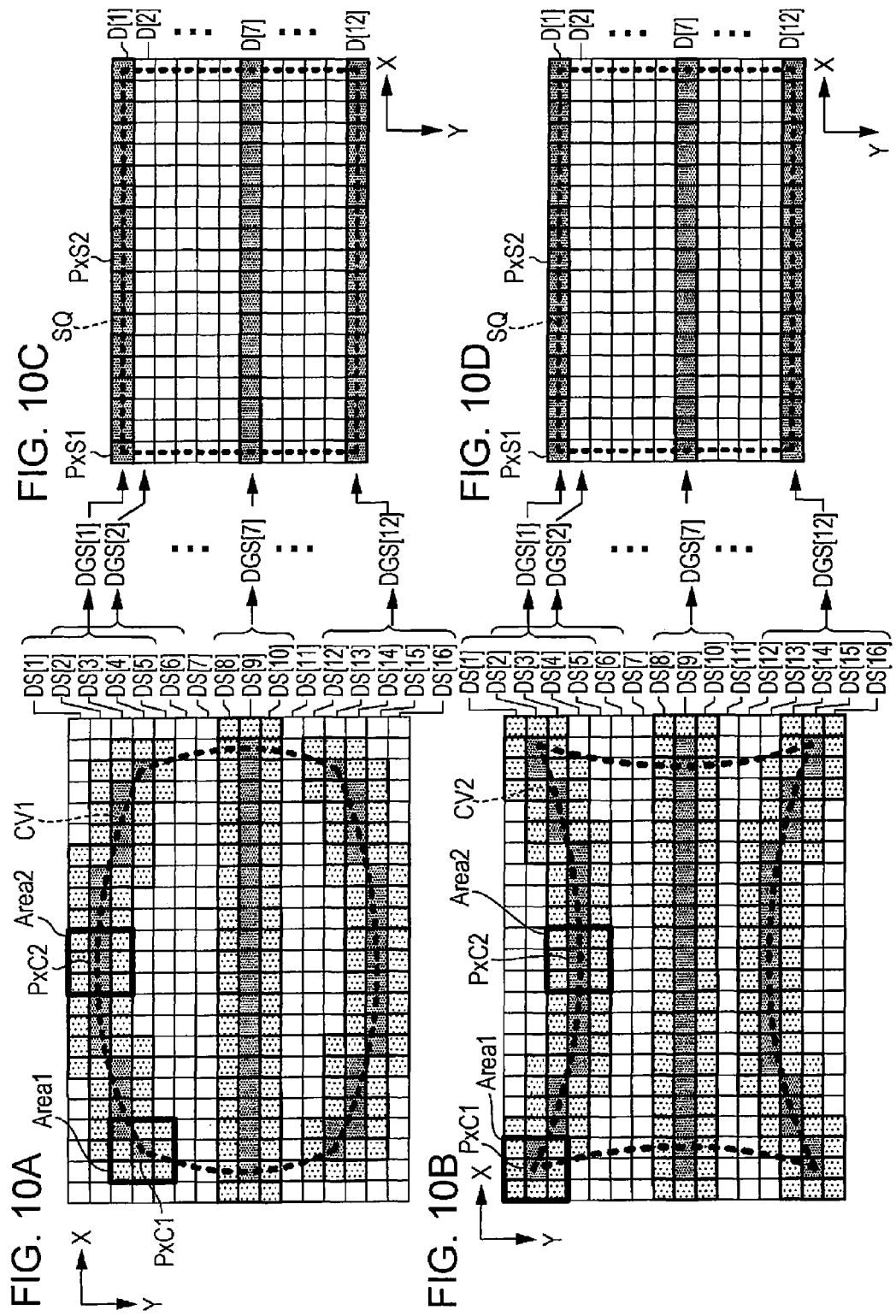

TBL

| LENS UNIT TYPE | FOCAL LENGTH: f | PHASE DIFFERENCE |
|---|---|---|
| WQA00006 | 28 mm ≤ f < 50 mm | 15 ms |
| | 50 mm ≤ f < 100 mm | 10 ms |
| | 100 mm ≤ f < 150 mm | 7 ms |
| | ⋮ | ⋮ |
| SSZ01234 | 35 mm ≤ f < 45 mm | 10 ms |
| | 45 mm ≤ f < 60 mm | 8 ms |
| | 60 mm ≤ f < 70 mm | 7 ms |
| | ⋮ | ⋮ |
| QRD0002 | 35 mm | 12 ms |
| QRD0007 | 28 mm | 22 ms |
| ⋮ | ⋮ | ⋮ |

IMAGING DISPLAY DEVICE AND CONTROL METHOD THEREOF

BACKGROUND

1. Technical Field

The present invention relates to an imaging display device and a control method thereof.

2. Related Art

In a so-called mirrorless digital camera, an image of an object can be confirmed by a so-called live view operation in which an image in accordance with an image signal imaged by a charged coupled device (CCD) image sensor, a complementary metal-oxide semiconductor (CMOS) image sensor, or the like is displayed on a liquid crystal panel provided on the housing rear surface, an electronic view finder (hereinafter, referred to as EVF) attached to a housing upper portion, or the like in real time.

However, in this live view, considerable delay is caused from imaging the object by an image sensor to displaying on the view finder or the like. Because of this, it is difficult to allow the camera to follow a moving object. Moreover, if an instruction of imaging of a still image based on the displayed object image is given, a gap is generated between the timing of the displayed object image and the timing of the actually imaged still image. In particular, in a case where the objects move fast, it is difficult to image an intended still image.

Because of this, there is a known technique of shortening delay from imaging by an image sensor to displaying by a display unit such as a view finder or the like.

For example, JP-A-2007-243615 discloses a technique of decreasing delay from outputting a signal output by an image sensor to displaying an image based on the signal by synchronizing a signal regulating a timing of driving the image sensor and a signal regulating a timing of reading an image signal with a certain phase difference.

Meanwhile, in a lens used in an imaging display device, if there is a lens with great lens distortion or chromatic aberration, there is also a lens in which such aberration is small. In addition, in a lens having a zoom function, a zooming rate is changeable. However, there is a case where the extent of lens distortion changes in accordance with the zooming rate. Moreover, there is a case where the extent of chromatic aberration of magnification changes in accordance with the zooming rate. Generally, the greater the extent of the aberration is, the longer is the time required for image processing for correcting the aberration.

However, in the imaging display device described in JP-A-2007-243615, a phase difference from the start of a frame of an image sensor to the start of a frame of a display unit (delay time) is constant. Because of this, in the imaging display device in the related art, since it is needed to determine the phase difference in expectation of the maximum aberration that was assumed, there was a limit in decreasing the delay from outputting the signal by an image sensor to displaying an image based on the signal. In particular, in an imaging display device capable of exchanging a lens as in a so-called single lens reflex camera, since the optical properties of a lens for exchange that will be released in the future are unknown, there is a problem that the phase difference cannot be properly set.

SUMMARY

An advantage of some aspects of the invention is to control delay from imaging to displaying, even if the optical properties of the lens change, in accordance with the change in the optical properties.

According to an aspect of the invention, there is provided an imaging display device including: an imaging unit that outputs an imaging signal obtained by imaging an object through a lens unit; an image signal generating unit that generates an image signal by performing image processing in accordance with optical properties of at least the lens unit on the imaging signal; a display unit that displays an image based on the image signal output from the image signal generating unit; and a timing control unit that controls the imaging unit, the image processing unit, and the display unit so as to change a phase difference from the frame start of the imaging signal to the frame start of the image signal in accordance with the optical properties of the lens unit.

According to the aspect of the invention, since image processing is performed in accordance with the optical properties of the lens unit, the time required for the image processing fluctuates if the optical properties of the lens unit change, while, since the timing control unit changes a phase difference from the frame start of the imaging signal to the frame start of the image signal in accordance with the optical properties of the lens unit, it is possible to shorten the time delay from imaging to displaying compared to the case where the phase difference is fixed.

In the imaging display unit according to the one aspect described above, preferably, the lens unit outputs optical property data indicating parameters related to the optical properties of the lens unit, and the imaging display device preferably further includes a control unit that determines the phase difference based on the optical property data obtained from the lens unit.

According to the aspect of the invention, since the phase difference is determined based on optical property data output by the lens unit, it is possible to reflect the optical properties of the lens unit in the phase difference. Here, a parameter related to the optical properties may be, for example, a figure that directly indicates the optical properties such as focal length, diaphragm value, zooming rate, and focus value, or a figure that indirectly indicates the optical properties as in identifying data for identifying the type of the lens unit. Moreover, the parameter related to the optical properties may be a figure determining the phase difference.

In the imaging display device according to the one aspect described above, preferably, the lens unit is detachable from a main body, the parameters related to the optical property data include identifying data for identifying the type of the lens unit, the image signal generating unit performs aberration correction processing in which aberration of the lens unit is corrected in accordance with the optical property data as a part of the image processing, and the control unit determines the phase difference in consideration of the time required for the aberration correction processing.

According to the aspect of the invention, even if the lens unit is exchanged, it is possible to specify the aberration of the lens unit by the identifying data for identifying the type of the lens unit, and thus it is possible to determine the phase difference considering the time required for the correction processing of the aberration. Because of this, compared to the case where the phase difference is fixed, it is possible to shorten the time delay from imaging to displaying by changing the phase difference in accordance with the type of the lens unit.

In the imaging display device according to the one aspect described above, preferably, the parameters related to the optical property data include at least one of zooming rate data that indicates zooming rate and focal length data that indicates focal length, the image signal generating unit performs the aberration correction processing in which the aberration of the lens unit is corrected in accordance with the optical property data as a part of the image processing, and the control unit determines the phase difference in consideration of the time required for the aberration correction processing.

According to the aspect of the invention, since it is possible to determine the phase difference in accordance with at least one of zooming rate, focal length, and diaphragm value, it is possible to properly set the time delay from imaging to displaying, in the case where the aberration of the lens unit generated in accordance with these optical properties is corrected, even if the time required for the aberration correction processing changes.

In the imaging display device according to the one aspect described above, preferably, the timing control unit delays, after generating an imaging vertical synchronization signal that regulates the frame start of the imaging signal, the imaging vertical synchronization signal by only the phase difference, and generates the display vertical synchronization signal that regulates the frame start of the image signal, and supplies the imaging vertical synchronization signal to the imaging unit while supplying the display vertical synchronization signal to the display unit.

According to the aspect of invention, first, an imaging vertical synchronization signal that controls the imaging unit is generated, the imaging vertical synchronization signal is delayed, and a display vertical synchronization signal that controls the display unit is generated. Because of this, it is possible to match the frame synchronization of the display unit with the frame synchronization of the imaging unit. The frame synchronization of the imaging unit is generally determined by the brightness of an image. Therefore, it is possible to suppress the decrease in the quality of the displayed image by prioritizing the frame cycle of the imaging unit over the frame cycle of the display unit. Moreover, if the display vertical synchronization signal is first generated, the display vertical synchronization signal is delayed, and the image vertical synchronization signal is generated, it is not possible to generate an imaging signal and to display an image right after power is supplied regardless of the imaging unit being operable. In contrast, it is possible to quickly display an image even right after the power is supplied by generating the vertical synchronization signals in the order of the imaging vertical synchronization signal → the display vertical synchronization signal.

According to another aspect of the invention, there is provided a control method of an imaging display device including an imaging unit that outputs an imaging signal obtained by imaging an object through a lens unit, an image signal generating unit that generates an image signal by performing image processing in accordance with optical properties of at least the lens unit on the imaging signal, and a display unit that displays an image based on the image signal output from the image signal generating unit, the method including: obtaining the optical properties of the lens unit; and controlling the imaging unit, the image processing unit, and the display unit so as to change the phase difference from the frame start of the imaging signal to the frame start of the image signal in accordance with the obtained optical properties of the lens unit.

According to the aspect of invention, since image processing is performed in accordance with the optical properties of the lens unit, the time required for the image processing fluctuates if the optical properties of the lens unit change, while, since a phase difference from the frame start of the imaging signal to the frame start of the image signal is changed in accordance with the optical properties of the lens unit, it is possible to shorten the time delay from imaging to displaying compared to the case where the phase difference is fixed.

BRIEF DESCRIPTION OF THE DRAWINGS

The invention will be described with reference to the accompanying drawings, wherein like numbers reference like elements.

FIG. 7 is a block diagram illustrating the configuration of the image signal generating unit.

FIGS. 8A and 8B are diagrams for describing thinning processing.

FIG. 9 is a diagram for describing chromatic aberration of magnification.

FIGS. 10A to 10D are diagrams for describing distortion correction processing.

DESCRIPTION OF EXEMPLARY EMBODIMENTS

The embodiments for implementing the invention will be described with reference to the drawings. However, in each drawing, the dimensions and the scale of each unit are allowed to be suitably different from the actual ones. In addition, since the embodiments described hereinafter are suitable and specified examples of the invention, various limits that are technically preferable are attached. However, the scope of the invention is not limited to the embodiments of the description, unless, in particular, the description hereinafter is not intended to limit the invention.

1. Configuration of Imaging Display Device

Figure 1:
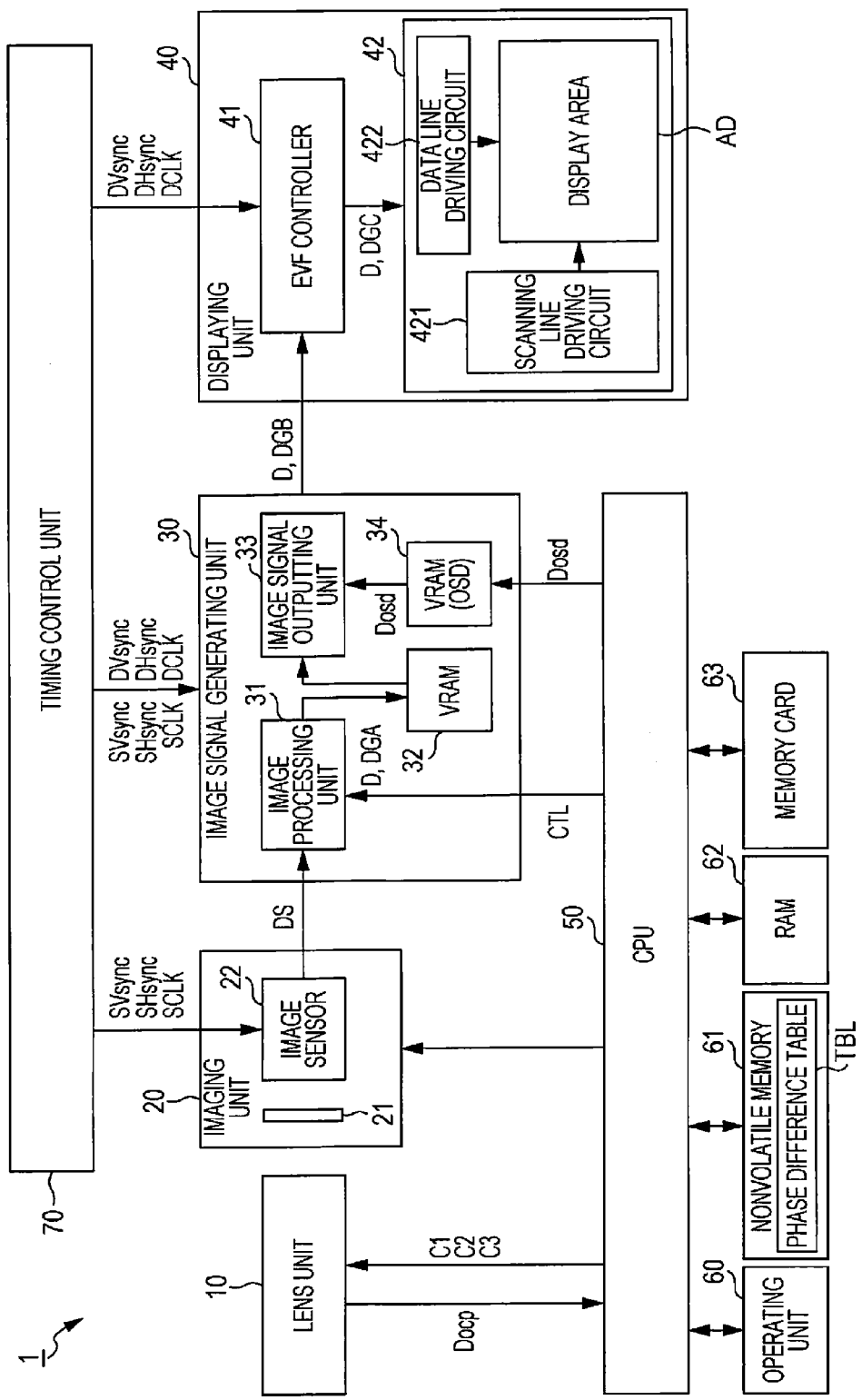
FIG. 1 is a block diagram illustrating the configuration of the imaging display device related to the embodiment of the invention.

FIG. 1 is the block diagram illustrating the configuration of the imaging display device 1.

As illustrated in FIG. 1, the imaging display device 1 includes a lens unit 10 in which an image of an object is formed, an imaging unit 20 that images an object and outputs the data obtained by the imaging as an imaging signal DS, an image signal generating unit 30 that generates an image signal D by performing image processing on the imaging signal DS, a display unit 40 that displays an image in accordance with the image signal D, a central processing unit (CPU) 50 that controls the entire device, an operating unit 60 for inputting a change of the setting of the imaging display device 1, an instruction of imaging, or the like, a non-volatile memory 61 in which a boot program and a phase difference table TBL are stored, a random access memory (RAM) 62 that functions as an operation area of the CPU 50, a memory card 63 in which still image data is stored, and a timing control unit 70 that generates various timing signals. The CPU 50 generates an OSD image signal Dosd that displays imaging conditions such as a shutter speed, backlight correction, and a diaphragm value, or the like, and stores the signal in a VRAM 34 to be described later. In addition, in the description hereinafter, a configuration of the imaging display device 1 except for the lens unit 10 is referred to as a main body.

This imaging display device 1 is a so-called mirrorless digital single lens reflex camera, and is capable of exchanging the lens unit 10. In addition, by operation of the operating unit 60 by a user of the imaging display device 1, it is possible to select an operation by a live view mode in which an image related to an object imaged in the imaging unit 20 is displayed on the display unit 40 approximately in real time, and an operation by an imaging mode in which an image related to the object imaged in the imaging unit 20 is stored as still image data in the memory card 63 for storing a still image.

Figure 2:
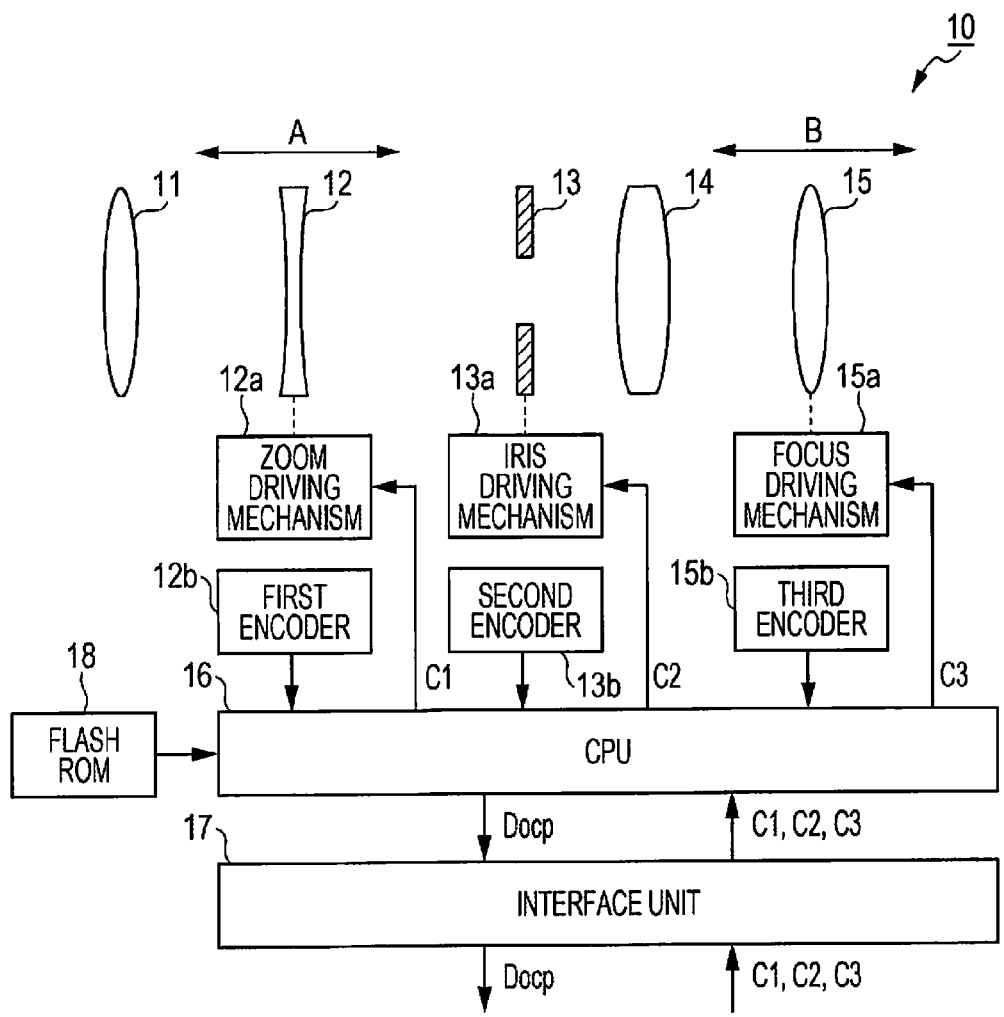
FIG. 2 is a block diagram illustrating the configuration of the lens unit

FIG. 2 is a detailed block diagram of the lens unit 10. The lens unit 10 includes an imaging optical system. This imaging optical system includes, in order from the object side to the image side (camera side), a fixed lens 11, a variable magnification lens 12, an iris 13, a fixed lens 14, and a focus lens 15. Each of the lenses may be configured by one lens or a plurality of lenses.

A zoom driving mechanism 12a is a mechanical mechanism that moves the variable magnification lens 12 in the direction of an arrow A in the drawings, and is capable of a manual operation by the user and an electric operation. In the case of the electric operation, a control signal C1 that controls the zoom driving mechanism 12a is transmitted from the main body. The control signal C1 is captured by the CPU 16 through an interface unit 17 and is supplied from the CPU 16 to the zoom driving mechanism 12a. The position of the variable magnification lens 12 is detected by a first encoder 12b, and the detection result is supplied to the CPU 16. The focal length and the zooming rate are determined in accordance with the position of the variable magnification lens 12.

An iris driving mechanism 13a is a mechanical mechanism that drives the iris 13, and is capable of the manual operation by the user and the electric operation. In the case of the electric operation, a control signal C2 that controls the iris driving mechanism 13a is transmitted from the main body. The control signal C2 is captured by the CPU 16 through the interface unit 17 and is supplied from the CPU 16 to the iris driving mechanism 13a. The state of the iris 13 is detected by a second encoder 13b, and the detection result is supplied to the CPU 16. In addition, in the state of the iris 13, the iris 13 receives an instruction passed from the interface unit 17 from the camera side and performs a narrowing operation by a mechanism for driving.

A focus driving mechanism 15a is a mechanical mechanism that moves the focus lens 15 in the direction of an arrow B in the drawings, and is capable of the manual operation by the user and the electric operation. In the case of the electric operation, a control signal C3 that controls the focus driving mechanism 15a is transmitted from the main body. The control signal C3 is captured by the CPU 16 through the interface unit 17 and is supplied from the CPU 16 to the focus driving mechanism 15a. The position of the focus lens 15 is detected by a third encoder 15b, and the detection result is supplied to the CPU 16. In addition, in the state of the focus lens 15, the focus lens 15 receives an instruction passed from the interface unit 17 from the camera side and performs an operation of reciprocally moving the focus position by the focus driving mechanism 15a.

In a flash ROM 18, identifying data for identifying the type of the lens unit 10 is stored. The identifying data is, for example, a model number, and it is possible to specify the basic optical properties of the lens unit 10 by the identifying data. Because of this, the identifying data is one of the parameters that illustrate the optical properties of the lens unit 10. The CPU 15 specifies the focal length based on the output signal of the first encoder 12b, the diaphragm value based on the output signal of the second encoder 13b, and the focus value based on the output of the third encoder 15b. The focal length, the diaphragm value, and the focus value specified in this manner are included in the parameters related to the optical properties of the lens unit 10. In addition, the zooming rate that is a value obtained by dividing the specified focal length by the minimum focal length is also included in the parameters related to the optical properties of the lens unit 10.

The CPU 16 generates optical property data Docp that includes such parameters and transmits the parameters to the main body through the interface unit 17.

The description is returned to FIG. 1. The imaging unit 20 includes a mechanical shutter 21 and an image sensor 22 that line-sequentially scans the signal from a photodetector (imaging element) arranged in a matrix shape and outputs the imaging signal DS in accordance with the image of the object.

Next, the image signal generating unit 30 includes an image processing unit 31 that generates the image signal D (DGA) based on the imaging signal DS, a VRAM 32 that temporarily stores the image signal D (DGA), a VRAM (OSD) 34 that stores the OSD image signal Dosd, and an image signal outputting unit 33 that outputs an image signal D (DGB) obtained by composing the image signal D (DGA) read by the VRAM 32 and the OSD image signal Dosd read by the VRAM (OSD) 34 on the display unit 40. In addition, in the description hereinafter, there is a case where the image signal D (DGB) is simply written as an image signal D.

Next, the display unit 40 is an electronic view finder (EVF) for displaying the image illustrating the object that is an imaging target and for allowing the user of the imaging display device 1 to grasp the state of the object, and includes a liquid crystal panel 42 for displaying the image in accordance with the image signal D generated by the image signal generating unit 30 and an EVF controller 41 that controls the operation of the liquid crystal panel 42.

In the liquid crystal panel 42, a display area AD for displaying the image in accordance with the image signal D is provided. The display area AD is configured to include a scanning line of an M row extending in the direction of an X axis, a data line of an N column extending in the direction of a Y axis, and pixels of the M row×N column also received corresponding to the intersection of the scanning line and the data line (refer to FIG. 3C). In addition, the liquid crystal panel 42 includes a scanning line driving circuit 421 for selecting the scanning line, a data line driving circuit 422 for driving the data line, and an ocular optical system (omitted in the drawings) for enlarging the image displayed in the display area AD to make it possible to watch the image.

Figure 3A:
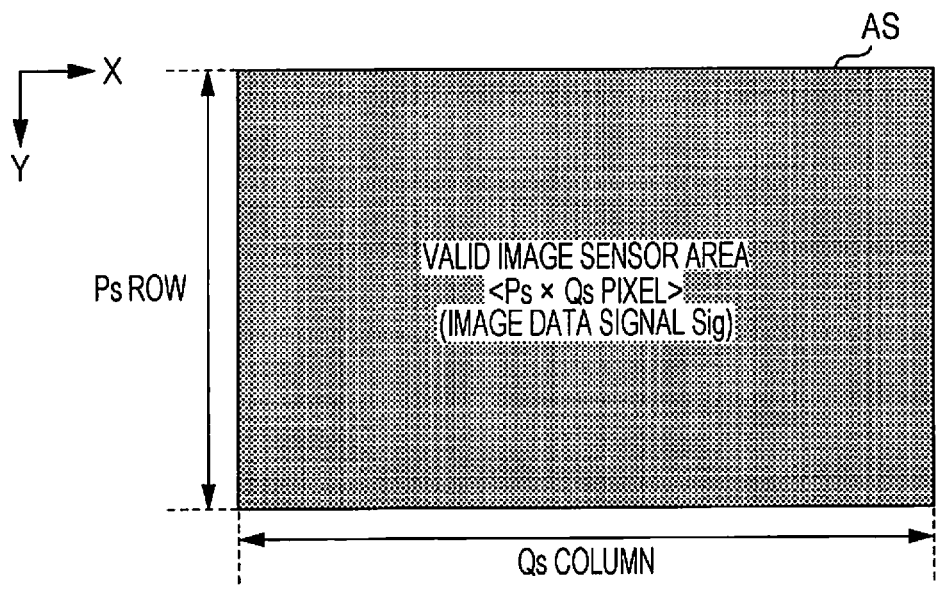
FIGS. 3A to 3C are diagrams for describing the relationship between a valid image sensor area and a display area.

As illustrated in FIG. 3A, the image sensor 22 is arranged in a matrix shape so that, in a valid image sensor area AS, a plurality of photodetectors are in a QS column in the direction of the X axis (horizontal direction) and in a PS row (PS line) in the direction of the Y axis (vertical direction) that intersects with the direction of the X axis (the PS and the QS are natural numbers equal to or more than 2). In other words, in the valid image sensor area AS, the lines composed of the photodetectors of QS arranged in the direction of the X axis are configured to be arranged by the PS rows in the direction of the Y axis. Each photodetector generates a pixel data signal Sig in accordance with the detected light intensity.

In addition, a color filter in any color among red, green, and blue is provided in a Bayer array so as to correspond to each photodetector one by one. Hereinafter, there is a case where a set of one photodetector and a color filter provided corresponding to the one photodetector is referred to as the pixel of the image sensor 22.

In the case where the imaging display device 1 operates on the imaging mode, the image sensor 22 is capable of outputting the entire pixel data signal Sig that is output from the photodetectors in the PS row×QS column provided in the valid image sensor area AS as imaging data for a still image. In addition, if the imaging data for a still image is output, the image signal generating unit 30 to be described later performs various kinds of image processing including filter processing or the like on the imaging data for a still image to generate still image data and stores the generated still image data in the memory card 63 for storing a still image.

Figure 3B:
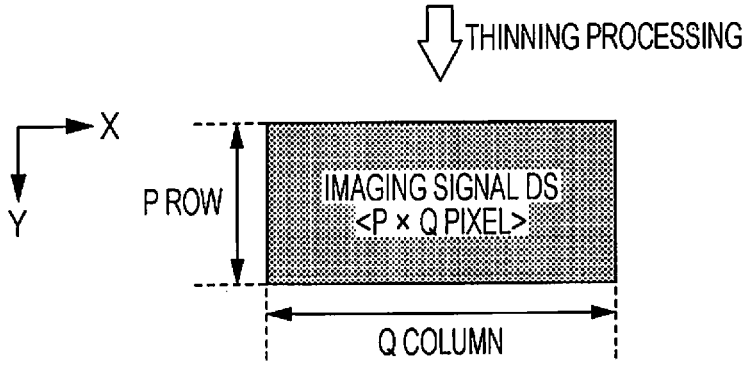

Meanwhile, the image sensor 22, in the case where the imaging display device 1 operates on the live view mode, decreases the data pixel size of the pixel data signal Sig by performing thinning processing on the pixel data signal Sig output by the photodetectors in the PS row×QS column, and outputs the signal as the imaging signal DS corresponding to the pixels in a P row×Q column as illustrated in FIG. 3B (P is a natural number that satisfies 2≤P≤PS; Q is a natural number that satisfies 2≤Q≤QS).

In addition, the image sensor 22 may include a pixel in an area other than the valid image sensor area AS. The description of the pixel in the valid image sensor area AS will be omitted for the sake of simplicity in this specification.

Figure 3C:
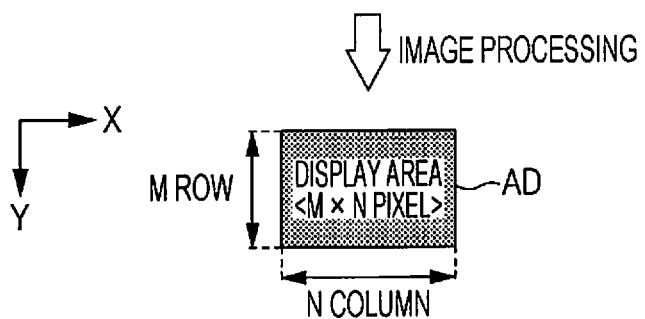

In addition, as illustrated in FIG. 3C, in the liquid crystal panel 42, in the display area AD, a plurality of pixels are arranged in a matrix shape so as to be in the N column in the direction of the X axis and the M row (M line) in the direction of the Y axis (M is a natural number that satisfies 2≤M≤P; N is a natural number that satisfies 2≤N≤Q). In other words, in the display area AD, the line composed of the pixels of N arranged in the direction of the X axis is configured to be arranged by the M rows in the direction of the Y axis. These pixels in the M row×N column include a pixel for displaying red, a pixel for displaying green, and a pixel for displaying blue. In the display area AD, an image in accordance with the image signal D generated by the image signal generating unit 30 is color-displayed.

As described above, M≤P and N≤Q. In short, there is a case where the number of the valid pixels provided in the valid image sensor area AS and the number of the pixels provided in the display area AD are different.

In addition, coordinate systems illustrated in FIGS. 3A to 3C are respectively a coordinate system fixed in the valid image sensor area AS, a coordinate system in a concept for displaying the imaging signal DS, and a coordinate system fixed in the display area AD, and the direction of each axis of the third coordinate systems may differ from each other.

The image signals D described above are signals that regulate a color image (gradation) so as to respectively display the pixels in the M row×N column provided in the display area AD of the liquid crystal panel 42. Hereinafter, in the image signal D illustrating the image so as to be displayed in the display area AD, the image signals D for one line illustrating the image so as to be displayed on the line in an mth row of the display area AD are referred to as an image signal D[m] (m is a natural number that satisfies 1≤m≤M).

Next, the timing control unit 70 illustrated in FIG. 1 generates an imaging vertical synchronization signal SVsync, an imaging horizontal synchronization signal SHsync, and an imaging dot clock signal SCLK, and outputs such signals to the image sensor 22, while generating a display vertical synchronization signal DVsync, a display horizontal synchronization signal DHsync, and a display dot clock signal DCLK, and outputting such signals to the EVF controller 41.

Figure 4:
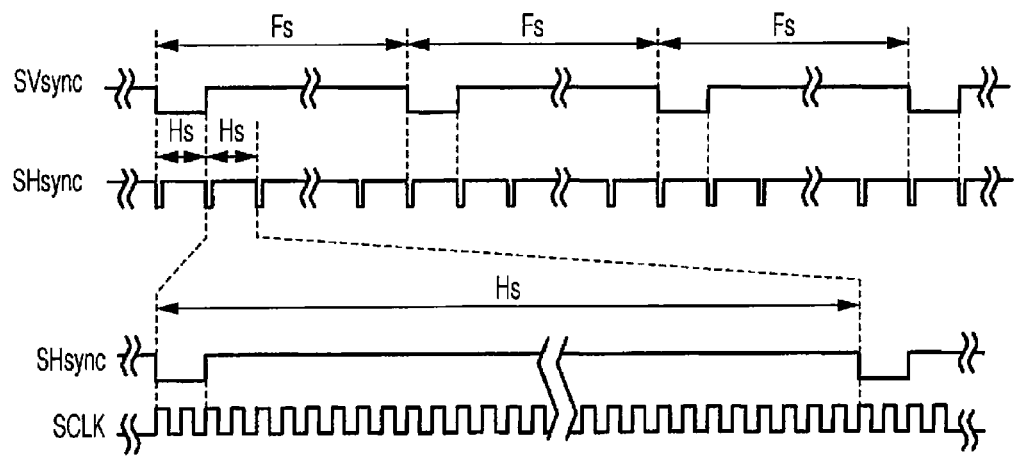
FIG. 4 is a timing chart for describing the operation of the imaging display device.

FIG. 4 is a timing chart for describing the imaging vertical synchronization signal SVsync, the imaging horizontal synchronization signal SHsync, and the imaging dot clock signal SCLK generated by the timing control unit 70. The imaging vertical synchronization signal SVsync is a signal that regulates an imaging vertical scanning period Fs (that is, a frame time of the imaging unit 20) for reading the pixel data signal Sig from the photodetector of the entire valid image sensor area AS (for the PS line) of the image sensor 22. The imaging horizontal synchronization signal SHsync is a signal that regulates an imaging horizontal scanning period Hs for reading the pixel data signals Sig from the photodetectors for one line of the valid image sensor area AS. The imaging dot clock signal SCLK is a signal that regulates timing for reading the pixel data signals Sig from the photodetector for one pixel of the valid image sensor area AS.

Figure 5:
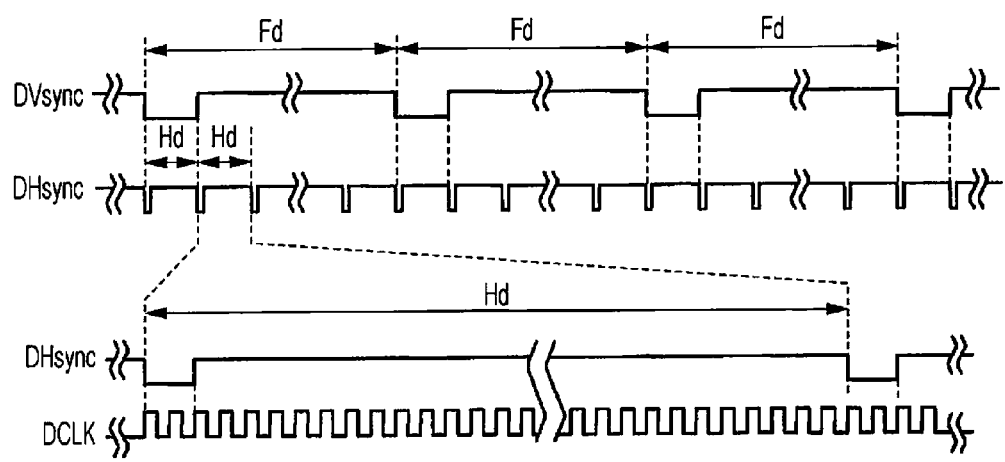
FIG. 5 is a timing chart for describing the operation of the imaging display device.

FIG. 5 is a timing chart for describing a display vertical synchronization signal DVsync, a display horizontal synchronization signal DHsync, and a display dot clock signal DCLK generated by the timing control unit 70. The display vertical synchronization signal DVsync is a signal that regulates a display vertical scanning period Fd (that is, a frame time of the display unit 40) for displaying an image in a pixel of the entire display area AD (for the M line) of the liquid crystal panel 42. The display horizontal synchronization signal DHsync is a signal that regulates a display horizontal scanning period Hd for displaying the image by the pixels for one line of the display area AD. The display dot clock signal DCLK is a signal that regulates timing for displaying an image in each pixel of the display area AD.

The duration of the imaging vertical scanning period Fs in the image sensor 22 and the duration of the display vertical scanning period Fd in the display unit 40 in this embodiment are set so as to be equal to each other. Meanwhile, the duration of the imaging horizontal scanning period Hs and the duration of the display horizontal scanning period Hd are different from each other.

In addition, the timing control unit 70 outputs various timing signals to the image signal generating unit 30. However, the timing signals may include a part or all of the imaging vertical synchronization signal SVsync, the imaging horizontal synchronization signal SHsync, the imaging dot clock signal SCLK, the display vertical synchronization signal DVsync, the display horizontal synchronization signal DHsync, and the display dot clock signal DCLK.

Figure 6:
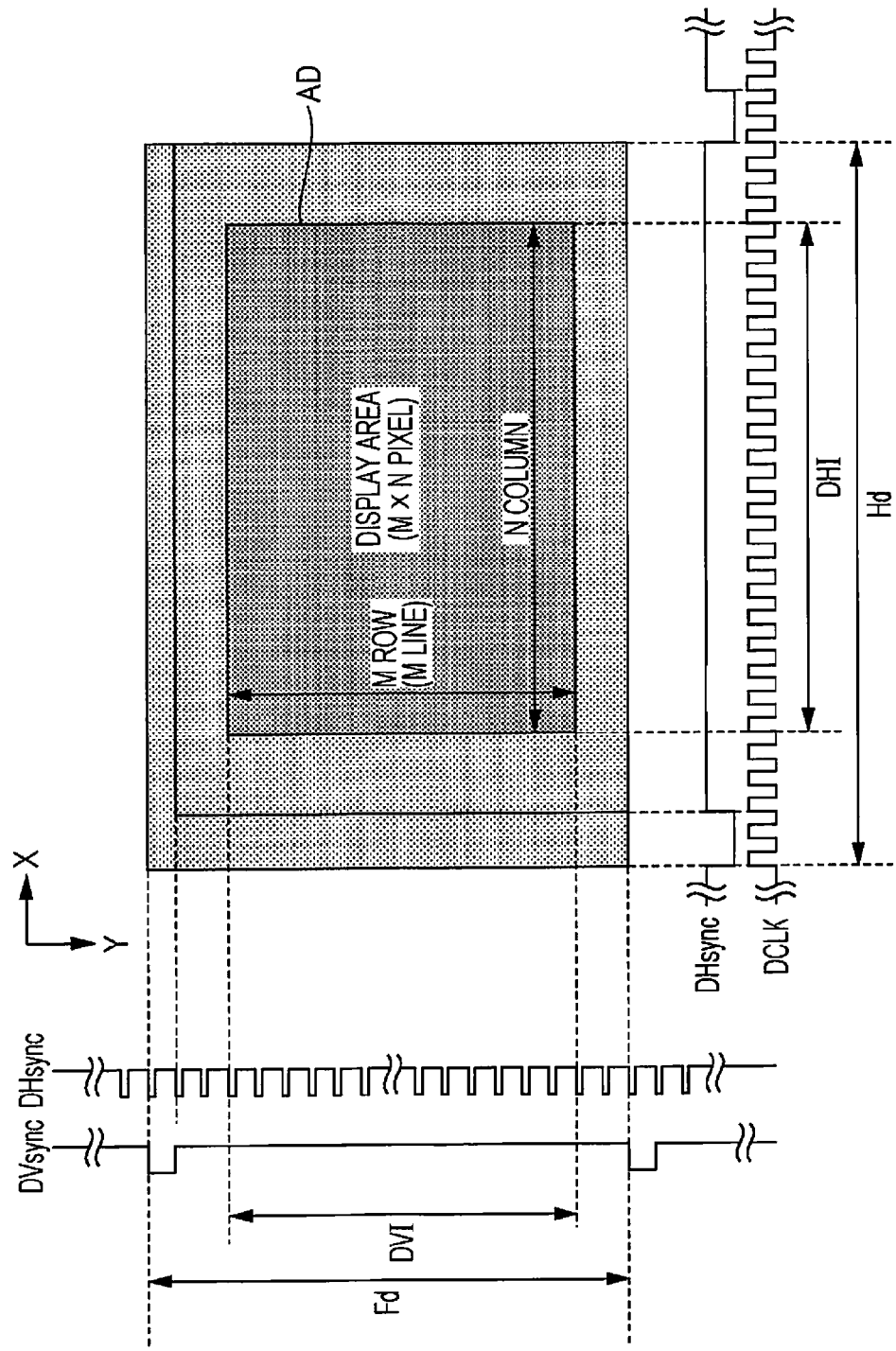
FIG. 6 is a diagram for describing the display area.

FIG. 6 is a diagram for describing the relationship between various signals generated by the timing control unit 70 and a display timing of the image in the display area AD of the liquid crystal panel 42.

As illustrated in this drawing, the pixels in the M row×N column that extend from a line in a first row to a line in an Mth row included in the display area AD display the pixels for one screen indicated by the image signals D[1] to D[M] during a vertical valid data period DVI of the display vertical scanning period Fd.

In addition, the pixels of N that configure the line in the mth row in the display area AD display the image indicated by the image signal D[m] during, of the display horizontal scanning period Hd, a horizontal valid data duration DHI.

2. Image Processing

Next, with reference to FIGS. 7 to 9, the image signal generating unit 30 will be described in detail, and the image processing performed by the image processing unit 31 will be described.

FIG. 7 is the block diagram illustrating the configuration of the image processing unit 31.

As illustrated in this drawing, the image processing unit 31 includes a line buffer 311 that temporarily stores the imaging signal DS output from the image sensor 22, a pixel complementation processing unit 312 that performs complementation processing on the imaging signal DS stored in the line buffer 311, a color reproduction processing unit 313 that performs color reproduction processing (3×3 matrix calculation) on the complemented imaging signal DS, a filter processing unit 314 that performs filter processing on the imaging signal DS in which the color is reproduced, a gamma correcting unit 315 that performs gamma correction on the imaging signal DS subjected to the filter processing, a line buffer 316 that temporarily stores the imaging signal DS which is subjected to the gamma correction, and a resize processing unit 317 that performs resize processing of converting the imaging signal DS stored in the line buffer 316 to the image signal D of the pixel number included in the display area AD.

FIGS. 8A and 8B are diagrams for describing the relationship between the pixel data signal Sig output by the photodetector included in the image sensor 22 and the imaging signal DS. As described above, in the case where the imaging display device 1 operates in the imaging mode, the image sensor 22 outputs the entire pixel data signal Sig illustrated in FIG. 8A as imaging data for a still image. Meanwhile, in the case where the imaging display device 1 operates in the live view mode, the image sensor 22 thins the pixel data signal Sig and outputs the imaging signal DS illustrated in FIG. 8B.

In FIG. 8A, each of the rectangles to which "R" is attached indicates the pixel data signal Sig output from the photodetector corresponding to the pixel in red (for detecting red light), each of the rectangles to which "G" is attached indicates the pixel data signal Sig output from the photodetector of the pixel in green, and each of the rectangles to which "B" is attached indicates the pixel data signal Sig output from the photodetector of the pixel in blue.

In addition, in FIG. 8B, each of the rectangles to which "R" is attached indicates the imaging signal DS for generating the image signal D in accordance with the pixel in red (determining the gradation so as to be displayed in the pixel in red) included in the display area AD, each of the rectangles to which "G" is attached indicates the imaging signal DS for generating the image signal D in accordance with the pixel in green included in the display area AD, and each of the rectangles to which "B" is attached indicates the imaging signal DS for generating the image signal D in accordance with the pixel in blue included in the display area AD.

In addition, in this embodiment, in the valid image sensor area AS of the image sensor 22, the case where the pixel in red, green, and blue is in a Bayer array is assumed.

As described above, the image sensor 22 outputs the imaging signal DS corresponding to the pixels in the P row×Q column by performing additional average reading and thinning processing on the pixel data signal Sig output by the photodetectors in the PS row×QS column.

In the thinning processing, the image sensor 22 thins the pixel data signal Sig output from the photodetectors in the PS row to the signals corresponding to the pixels in the P row in the direction of the Y axis.

Specifically, the image sensor 22 selects a reading target line from the PS row and reads the pixel data signal Sig output by the photodetectors positioned at the reading target line, while skipping over the pixel data signal Sig output from the photodetectors positioned at a line other than the reading target line to perform thinning in the direction of the Y axis.

In this embodiment, since the array of the pixel provided in the valid image sensor area AS of the image sensor 22 is a Bayer array, the reading target line is determined by the ratio of one of the lines per odd numbers.

In the case where the pixel is arranged in a Bayer array, a line composed of the pixel in red and green and a line composed of the pixel in green and blue are alternately arranged in the direction of the Y axis. Because of this, by deciding the reading target line by the ratio of one of the lines per odd numbers, it is possible to arrange the pixel after reading so that the line composed of the pixel in red and green and the line composed of the pixel in green and blue are alternately arranged in the direction of the Y axis, and to prevent the pixel in the same color from adjoining to each other.

In an example illustrated in FIG. 8A, in the direction of the Y axis, the reading target line is determined by the ratio of one line per three lines. Specifically, among lines 1 to 9, a line 1, a line 4, and a line 7 are set as the reading target line. In this case, as illustrated in FIG. 8B, it is possible to obtain the imaging signal DS in which the pixel data signal Sig is thinned to ⅓ in the direction of the Y axis.

In addition, the image sensor 22 performs the additional average reading in the direction of the X axis, and sets the pixel data signal Sig output by the photodetectors in the QS column to be a signal (imaging signal DS) corresponding to the pixels in the Q column.

Specifically, the image sensor 22 miniaturizes the pixel data signal Sig output by the photodetectors of QS to a "predetermined fraction of one" by grouping the photodetectors of QS positioned at each reading target line so that a predetermined number of photodetectors become one set and additionally averaging the figure indicated by the pixel data signal Sig output by the predetermined number of photodetectors configuring each set. In addition, by additional averaging, an effect of a low-pass filter can be obtained and the generation of a folding noise can be suppressed.

In the case where the pixel of the image sensor 22 is in a Bayer array, since pixels in two colors are alternately arranged in each line, grouping of setting the predetermined number of photodetectors for every other photodetector to be one set in the direction of the X axis is performed. In addition, the value indicated by the pixel data signal Sig output by the predetermined number of the photodetectors configuring each set is additionally averaged.

In an example illustrated in FIG. 8A, in the direction of the X axis, three photodetectors for every other photodetector are grouped as one set and the value indicated by the pixel data signal Sig output by the three photodetectors in the same color configuring each set is additionally averaged. Specifically, for example, in the line 1 and the line 7, the pixels in red in a first, third, and fifth column are set as one set, the value of the pixel data signal Sig output by three photodetectors corresponding to the three pixels is additionally averaged by an adding machine Ave1, and the obtained average value is set as the value of the imaging signal DS corresponding to the pixel in red in the first column. Likewise, in the line 1 and the line 7, the value of the pixel data signal Sig output by photodetectors corresponding to the pixels in green in a second, fourth, and sixth column is additionally averaged by an adding machine Ave2, and the obtained average value is set as the value of the imaging signal DS corresponding to the pixel in green in the second column. In this case, as illustrated in FIG. 8B, it is possible to obtain the imaging signal DS in which the pixel data signal Sig is miniaturized to ⅓ in the direction of the X axis. In addition, by performing arithmetical average processing, the noise component of the signal is decreased.

As described above, the number of the pixel of the image indicated by the imaging signal DS and the number of the pixel of the image indicated by the image signal D (the number of the pixel in the display area AD) are different from each other. Because of this, in the resize processing unit 317, resize processing in which the imaging signal DS is converted to the image signal D corresponding to the number of the pixel in the display area AD is performed.

There is a case where the image indicated by the imaging signal DS has various aberrations such as lens distortion or a chromatic aberration of magnification caused by the optical properties of the lens unit 10. As for the lens distortion, specifically, in an image illustrating the imaging result at the time of imaging an object, there is barrel distortion in which a straight line at a screen periphery expands towards the outside compared to the image so as to be originally displayed in the display area AD, or spool-formed distortion in which the straight line at the screen periphery shrinks toward the inside compared to the image so as to be originally displayed.

In addition, the chromatic aberration of magnification is an aberration in which an imaged height for each color component deviates (magnification differs) when an image is formed through a lens. The aberration is caused by a difference in the color wavelengths of light components and by the difference in the refractive index of the lens. As for the chromatic aberration of magnification, for example, if the imaged height is high as illustrated in the FIG. 9, the longer the light wavelength is, the greater the magnification rate is, and thus the color shift in the periphery of the screen is great.

Because of this, in the resize processing unit 317, in resize processing, distortion correction processing of correcting the lens distortion of barrel distortion, spool-formed distortion, or the like and the chromatic aberration correction processing of correcting the chromatic aberration of magnification are also included to be performed.

Hereinafter, with reference to FIGS. 10A to 10D, distortion correction processing performed during the resize processing will be described. In addition, in FIGS. 10A to 10D, in order to simplify the description, a case is assumed where the number of the line of the image indicated by the imaging signal DS is 16 lines (P=16), and the number of the line of the image indicated by the image signal D is 12 lines (M=12). (Actually, DS is either 600 lines or 800 lines.)

FIGS. 10C and 10D illustrate the image indicated by the image signal D so as to be displayed in the display area AD when the object is imaged. FIG. 10A illustrates the image indicated by the imaging signal DS when barrel distortion is generated, while FIG. 10B illustrates the image indicated by the imaging signal DS when spool-shaped distortion is generated.

That is, FIG. 10A illustrates a case where, regardless of the image being a rectangle SQ to be displayed on the display area AD, the imaging, signal DS illustrates a close curve CV1 expanded from the rectangle SQ by the barrel distortion. In addition, FIG. 10B illustrates a case where, regardless of the image being a rectangle SQ to be displayed on the display area AD, the imaging signal DS illustrates a close curve CV2 shrunk from the rectangle SQ by the spool-shaped distortion.

The resize processing unit 317 corrects an image illustrated as the closed curve CV1 as illustrated in FIG. 10A to be an image illustrated as the rectangular SQ as illustrated in FIG. 10C in the distortion correction processing in the case where barrel distortion is generated as illustrated in FIG. 10A. Likewise, the resize processing unit 317 corrects an image illustrated as the closed curve CV2 as illustrated in FIG. 10B to be an image illustrated as the rectangular SQ as illustrated in FIG. 10D in the distortion correction processing in the case where barrel distortion is generated as illustrated in FIG. 10B.

In these cases, the resize processing unit 317 associates the pixel in the image before correction and the pixel in the image after correction, set the pixel before correction in accordance with the pixel after correction as a center pixel, and determines the gradation so as to display the pixel after correction based on the gradation displayed in each pixel in a reference area that includes the center pixel and a periphery pixel that is the pixel in the periphery thereof. Since barrel distortion or spool-shaped distortion, which is generally lens distortion has a property in which the distortion becomes greater in accordance with the distance from the optical center of the lens (center of the screen), processing of correcting in accordance with the distance from the center of the screen is performed. As a result, in the case where the data coordination to be corrected is smaller than the pitch of the pixel, processing of obtaining a gradation value by the complementation processing such as bilinear processing is performed.

For example, the resize processing unit 317 determines a pixel before correction PxC1 illustrated in FIG. 10A or 10B as the center pixel in the case of determining the gradation of a pixel after correction PxS1 illustrated in FIG. 10C or 10D. In addition, the resize processing unit 317 determines the gradation to be displayed in the pixel PxS1 based on the gradation to be displayed in each pixel in a reference area Area1 including the pixel PxC1, which is the center pixel.

Likewise, the resize processing unit 317 determines a pixel before correction PxC2 illustrated in FIG. 10A or 10B as the center pixel in the case of determining the gradation of a pixel after correction PxS2 illustrated in FIG. 10C or 10D. In addition, the resize processing unit 317 determines the gradation to be displayed in the pixel PxS2 based on the gradation to be displayed in each pixel in a reference area Area1 including the pixel PxC2, which is the center pixel.

In addition, the pixel attached with a thick hatching in FIGS. 10C and 10D illustrates the pixel after correction positioned at a first, seventh, and twelfth row in the image signal D. The pixel attached with a thick hatching in FIGS. 10A and 10B illustrates the pixel before correction (center pixel) in accordance with each pixel after correction. The pixel attached with a thin hatching in FIGS. 10A and 10B illustrates the periphery pixel in accordance with each center pixel.

As apparent also in an example illustrated in FIGS. 10A to 10D, the extent of the expansion of the image in the case where the barrel distortion is generated fluctuates by the position of the line of the screen. As the position in the vertical direction (direction of the Y axis) becomes closer to an end portion, the extent of the expansion of the image becomes greater. In addition, the extent of the contraction of the image in the case where the spool-shaped distortion is generated fluctuates by the position of the line of the screen. As the position in the vertical direction (direction of the Y axis) becomes closer to an end portion, the extent of the contraction of the image becomes greater.

Therefore, the number of the line of the imaging signal DS required in the case where the resize processing unit 317 generates the image signal D[m] fluctuates by the position of the line (value of m) in accordance with the image signal D[m]. Because of this, the duration required for the resize processing unit 317 to perform the resize processing fluctuates by the position of the line.

Here, the imaging signal DS in accordance with the lines in pth row is referred to as an imaging signal DS[p] (p is a natural number that satisfies 1≤p≤P).

In this case, for example, in an example illustrated in FIGS. 10A to 10D, for the resize processing unit 317 to generate an image signal D[1] in accordance with the lines in a first row, imaging signals DS[1] to DS[5] in accordance with the lines in the first to a fifth row are required. In contrast, for the resize processing unit 317 to generate an image signal D[7] in accordance with the lines in a seventh row, imaging signals DS[8] to DS[10] in accordance with the lines in an eighth to a tenth row are required. In short, the duration required for the resize processing unit 317 to generate the image signal D[1] is longer than the duration required for the image signal D[7] to be generated.

Hereinafter, an imaging signal DS[p] of one line or a plurality of lines required for the image signal D[m] to be generated is referred to as an imaging signal DGS[m].

For example, in the example illustrated in FIGS. 10A to 10D, the imaging signal DGS[1] required for the image signal D[1] to be generated is the imaging signals DS[p] for 5 lines of the imaging signals DS[1] to DS[5]. The imaging signal DGS[7] required for the image signal D[7] to be generated is the imaging signals DS[p] for 3 lines of the imaging signals DS[8] to DS[10]. The imaging signal DGS[12] required for the image signal D[12] to be generated is the imaging signals DS[p] for 5 lines of the imaging signals DS[12] to DS[16].

In addition, in the chromatic aberration correction processing, the chromatic aberration of magnification determined in accordance with the color (light wavelength) and the imaged height illustrated in FIG. 9 is corrected, as for the case of the above-described lens distortion, to be increased or decreased in accordance with the imaged height and the color by the image signal D.

The resize processing unit 317 stores the image signal D[m] for one generated line in the VRAM 32 if the resize processing is completed and the image signal D is generated for every line.

The lens distortion correction processing described above changes in accordance with the optical properties of the lens unit 10. For example, In the case of the lens unit 10 with small lens distortion, the imaging signal DGS[1] required for the image signal D[1] to be generated is the imaging signals DS[p] for 3 lines of the imaging signals DS[1] to DS[3]. On the other hand, in the case of the lens unit 10 with great lens distortion, the imaging signal DGS[1] required for the image signal D[1] to be generated can be the imaging signals DS[p] for 7 lines of the imaging signals DS[1] to DS[7].

Moreover, the extent of the lens distortion changes by the parameter related to the optical properties such as the type of the lens unit 10, focal length or zooming rate, diaphragm value, or focus value (in particular, the type of the lens unit 10 and focal length or zooming rate). However, the content of the lens distortion correction processing needs to be changed in accordance with the parameter related to the optical properties of the lens unit 10.

In addition, the content of the chromatic aberration correction processing changes in accordance with the parameter related to the optical properties of the lens unit 10. In the case that the chromatic aberration of magnification is great, color shift in the periphery of the screen becomes greater. On the other hand, in the case that the chromatic aberration of magnification is small, color shift in the periphery of the screen becomes smaller. The extent of the chromatic aberration of magnification changes by the parameter related to the optical properties such as the type of the lens unit 10, focal length or zooming rate, diaphragm value, or focus value (in particular, the type of the lens unit 10, focal length or zooming rate, and diaphragm value). Therefore, the content of the chromatic aberration correction processing needs to be changed in accordance with the parameter related to the optical properties of the lens unit 10.

Here, in this embodiment, the CPU 50 generates a correction processing control signal CTL that determines the content of the lens distortion correction processing and the chromatic aberration correction processing based on the optical property data Docp obtained from the lens unit 10 and supplies the content to the resize processing unit 317. The resize processing unit 317 performs the correction processing regulated by the correction processing control signal CTL. According to this, the lens unit 10 is exchanged, or the user operates the lens unit 10, and it becomes possible to change the content of the aberration correction processing in accordance with the change in the optical properties even if zooming rate, diaphragm value, or focus value changes.

3. Timing Control

From the imaging signal DS is output from the imaging unit 20, the time until the image signal D is output to the display unit 40 is preferably short, since the display delay is decreased as the time gets shortened. Meanwhile, the time required for the above-described image processing changes in accordance with the content of the lens distortion correction processing and the chromatic aberration correction processing performed in the resize processing unit 317. The timing control unit 70 described above generates the imaging vertical synchronization signal SVsync, the imaging horizontal synchronization signal SHsync, and the imaging dot clock signal SCLK that control the image sensor 22, while generating the display vertical synchronization signal DVsync, the display horizontal synchronization signal DHsync, and the display dot clock signal DCLK that control the display unit 40.

Here, the frame start of the imaging signal DS is regulated by the imaging vertical synchronization signal SVsync, and the frame start of the image signal D is regulated by the display vertical synchronization signal DVsync. Here, the time required for the aberration correction processing is secured and it becomes possible to shorten the display delay by changing a phase difference TD between the imaging vertical synchronization signal SVsync and the display vertical synchronization signal DVsync in accordance with the content of the lens distortion correction processing and the chromatic aberration correction processing performed in the resize processing unit 317.

Figure 11:
FIG. 11 is a diagram for describing a phase difference table.

The CPU 50 of this embodiment specifies the phase difference TD described above based on the optical property data Docp and supplies the phase difference TD to the timing control unit 70. Specifically, the CPU 50 refers to the phase difference table TBL stored in a non-volatile memory 61 to specify the phase difference TD. In FIG. 11, one example of stored content of the phase difference table TBL is illustrated. In the phase difference table TBL, the type of the lens unit and focal length indicated by the identifying data described above and the phase difference TD are associated and stored. In this example, the types of the lens unit "WQA00006" and "SSZ01234" are zoom lenses, while the types of the lens unit "QRD0002" and "QRD0007" are fixed focal length lenses. In addition, in a zoom lens, the shorter the focal length is, the greater the phase difference TD is. This is because that as the angle becomes wider, the lens distortion becomes greater, and the time required for the lens distortion correction becomes longer.

For example, when the identifying data included in the optical property data Docp indicates "WQA00006" and the focal length indicated by focal length data is "70 mm", the CPU 50 specifies 10 ms as the phase difference TD and supplies the phase difference to the timing control unit 70.

Since the CPU 50 described above determines the content of the aberration correction processing based on the optical property data Docp, the phase difference TD is determined in consideration of predetermined time required for the aberration correction processing changing by following the change of the parameter related to the optical properties of the lens unit 10.

In addition, as for the update of the phase difference table TBL, the following method may be applied. First, the phase difference table TBL is downloaded in the user's computer from a certain website in the internet and recorded in the memory card 63. Next, the memory card 63 is mounted on the imaging display device 1, and the phase difference table TBL recorded in the memory card 63 may be transmitted to the non-volatile memory 61. With the phase difference table TBL being updatable, even if a new lens unit 10 is released, it is possible to perform the aberration correction according to the new lens and to set the suitable phase difference TD.

In addition, the phase difference table TBL associates the type and the focal length of the lens unit 10 with the phase difference TD. However, the phase difference TD may be recorded by preparing an individual phase difference table for each type of the lens unit 10 and associating zooming rate and diaphragm value with each phase difference table. Moreover, the phase difference TD may be recorded by adding other parameter such as focus value.

Figure 12:
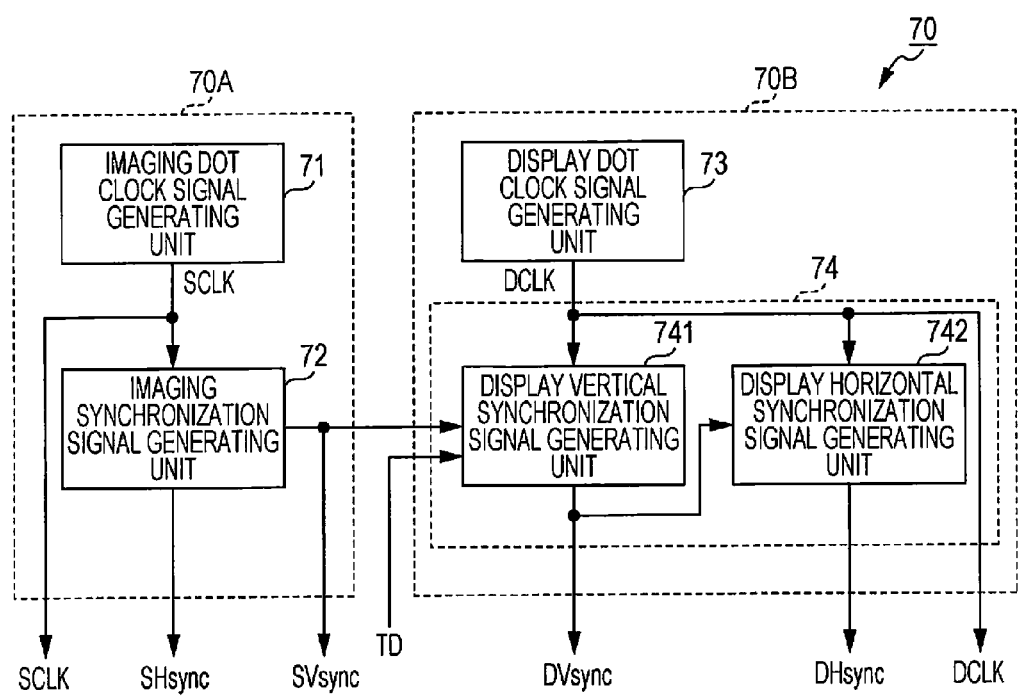
FIG. 12 is a block diagram illustrating the configuration of the timing control unit.

Next, the specific configuration of the timing control unit 70 will be described with reference to FIG. 12. As illustrated in FIG. 12, the timing control unit 70 includes a first timing generator 70A and a second timing generator 70B. The first timing generator 70A includes an imaging dot clock signal generating unit 71 that generates the imaging dot clock signal SCLK and an imaging synchronization signal generating unit 72 that generates the imaging vertical synchronization signal SVsync and the imaging horizontal synchronization signal SHsync based on the imaging dot clock signal SCLK.

In addition, the second timing generator 70B includes a display dot clock signal generating unit 73 that generates the display dot clock signal DCLK and a display synchronization signal generating unit 74 that generates the display vertical synchronization signal DVsync and the display horizontal synchronization signal DHsync based on the display dot clock signal DCLK. Moreover, the display synchronization signal generating unit 74 includes a display vertical synchronization signal generating unit 741 and a display horizontal synchronization signal generating unit 742.

The display vertical synchronization signal generating unit 741 generates the display vertical synchronization signal DVsync by delaying the imaging vertical synchronization signal SVsync by only the phase difference TD. For example, the display vertical synchronization signal generating unit 741 is capable of cascade connecting a D flip-flop of K and being configured by a selection circuit in which the output signal of each D flip-flop is selected in accordance with the phase difference TD.

By performing this, the imaging vertical synchronization signal SVsync and the display vertical synchronization signal DVsync are synchronized in a state where the time difference of the phase difference TD is held.

In addition, the display horizontal synchronization signal generating unit 742 may generate one display horizontal synchronization pulse by counting the predetermined number of the display dot clock signal DCLK from the falling edge of the display vertical synchronization signal DVsync, and generate the display horizontal synchronization signal DHsync by repeating the above process.

Figure 13:
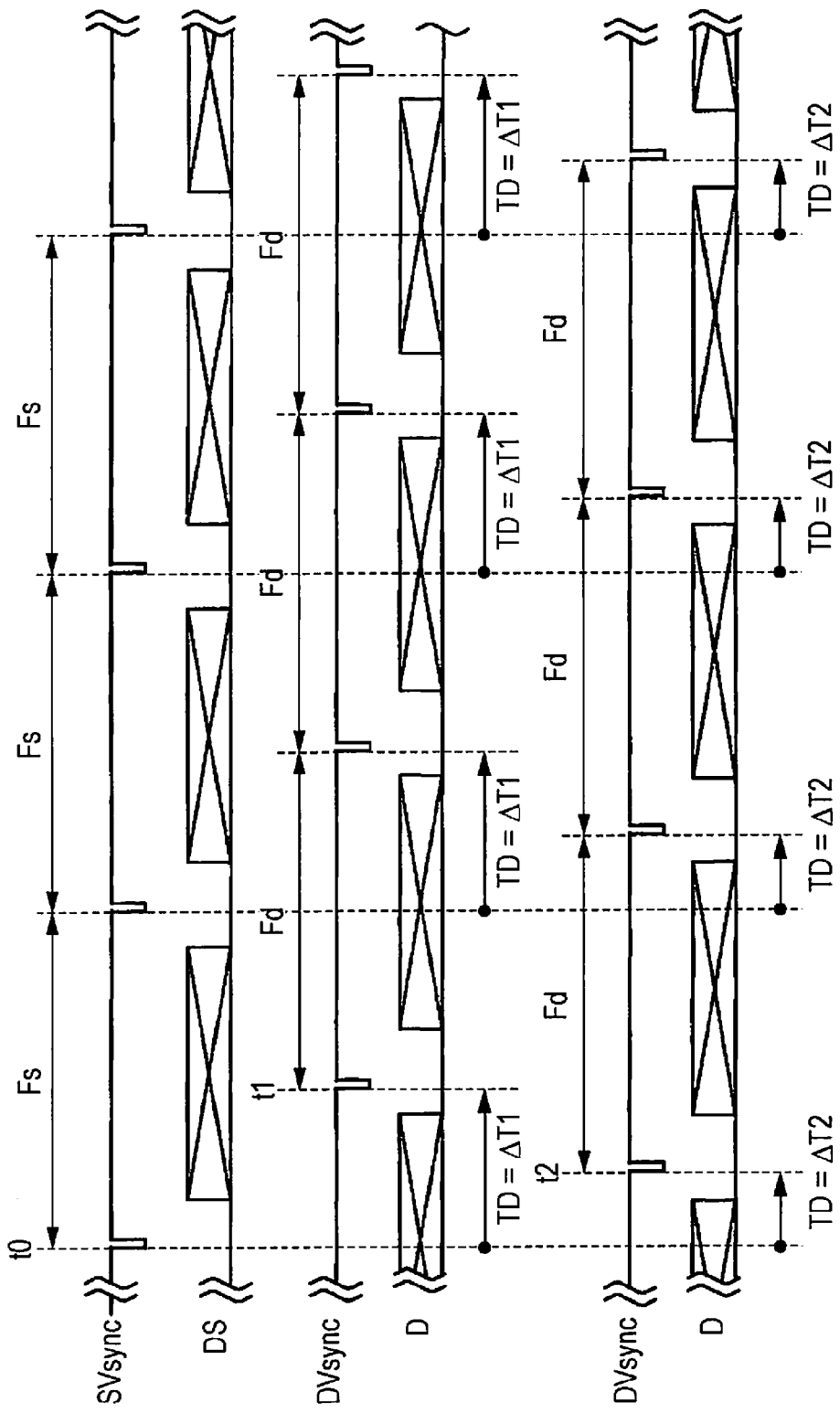
FIG. 13 is a timing chart for describing the operation of the imaging display device.

In FIG. 13, the timing chart of the imaging vertical synchronization signal SVsync, the imaging signal DS, the display vertical synchronization signal DVsync, and the image signal D in a case where the phase difference TD is ΔT1 and the case where the phase difference TD is ΔT2 is illustrated. Here, time t0 is frame starting time of the imaging signal DS, time t1 is frame starting time of the image signal D in the case where the phase difference TD is ΔT1, and time t2 is frame starting time of the image signal D in the case where the phase difference is ΔT2.

In the case where the phase difference TD is ΔT2, for example, the aberration correction processing is not performed in the resize processing unit 317. In this case, since the aberration correction processing is not performed, the imaging signal DS written in the line buffer 316 is promptly read by the resize processing unit 317, and stored in the VRAM 32 after being resized. In addition, the duration of the frame cycle of the display unit 40 is the same with the time of the frame cycle of the image sensor 22, and the imaging signal DS is supplied to the image signal generating unit 30. Therefore, the image signal D is read from the VRAM 32 so that the time until the image signal D is output to the display unit 40 is ΔT2.

In the case where the phase difference TD is ΔT1, for example, the aberration correction processing is performed in the resize processing unit 317. In this case, for the aberration correction processing to be performed, the imaging signal DS for the number of lines required for the processing is stored in the line buffer 316. In addition, the resize processing unit 317 generates the image signal D for displaying and stores the image signal D in the VRAM 32 with reference to the maintained imaging signal DS. In this case, since the line of the imaging signal DS to be referred in accordance with the position of the line of the image signal D to be a processing target is different, the generation timing of the image signal D changes in accordance with the line inside the frame. Here, the time required for the aberration correction processing becomes maximum in the case where the number of the line of the imaging signal DS to be referred for the image signal D of any line to be generated. If this maximum time is referred to as tmax, ΔT1=ΔT2+tmax. That is, the phase difference TD is determined in consideration of the maximum time tmax, which is the processing time in the line of which the reference line number is the greatest in the case where the image signals D[1] to D[M] of the Mth line are generated by the first line.

As seen from the above, in this embodiment, in accordance with the optical properties of the lens unit 10, the content of the image processing changes, and, following this, the phase difference TD from the frame start in the imaging unit 20 to the frame start of the display unit 40 changes. As a result, in the case where the optical properties of the lens unit 10 has small aberration, while the time required for the aberration correction processing is shortened, the time delay from imaging to displaying is shortened by decreasing the phase difference TD. On the other hand, in the case where the optical properties of the lens unit 10 has great aberration, while the time required for the aberration correction processing is longer, it is possible to secure the time for the aberration correction processing and suitably control the time delay from imaging to displaying by increasing the phase difference TD.

In addition, since the optical property data Docp is transmitted from the exchangeable lens unit 10 to the main body, even if a new lens unit 10 is released, it is possible to minimize the time delay from imaging to displaying by updating the phase difference table TBL.

Moreover, in this embodiment, first, an imaging vertical synchronization signal SVsync that controls an imaging unit 20 is generated, the imaging vertical synchronization signal SVsync is delayed, and a display vertical synchronization signal DVsync that controls the display unit 40 is generated. Because of this, it is possible to match the duration of the frame cycle of the imaging unit 20 with the duration of the frame cycle of the display unit 40. It is possible to determine the frame cycle of the imaging unit 20 in accordance with the brightness of the image captured by the image sensor 22. Therefore, it is possible to suppress the decrease in the quality of the displayed image by prioritizing the frame cycle of the imaging unit 20 over the frame cycle of the display unit 40.

Moreover, if the display vertical synchronization signal DVsync is first generated, the display vertical synchronization signal DVsync is delayed, and the imaging vertical synchronization signal SVsync is generated, it is not possible to generate the imaging signal DS and to display an image right after power is supplied regardless of the imaging unit 20 being operable. In contrast, it is possible to quickly display an image even right after the power is supplied by delaying the imaging vertical synchronization signal SVsync and generating the display vertical synchronization signal DVsync.

4. Application Examples

In the above-described embodiment, the imaging display device 1 is described as one example of a mirrorless digital single lens reflex camera. However, the imaging display device 1 can be applied to various electronic apparatuses.

Application Example 1

The imaging display device 1 can be applied to a digital camera of which the lens unit 10 is not exchangeable. In this case, the content of the aberration correction processing and the phase difference TD may be determined in accordance with at least one of the parameters related to the optical properties of the lens unit 10 such as focal length, zooming rate, diaphragm value, or focus value. In addition, for example, in a digital camera in which a manual function in which zoom, focus, iris, or the like is determined by the operation by the user is not equipped but zoom, focus, iris, or the like is set by the control from the main body side, as long as these parameters can be obtained in the main body, there is no need for transmitting the optical property data Docp from the lens unit 10.

Application Example 2

The imaging display device 1 can be applied to an electronic binocular or an electronic telescope of which the magnification is changeable. In this case, in accordance with the magnification (parameter related to the optical properties of the lens), the content of the aberration correction processing changes, and it is possible to minimize the time delay from imaging to displaying by deciding the phase difference TD according thereto.

Application Example 3

In the case where an electronic imaging display system is used instead of a side mirror or a back mirror used in a vehicle, the imaging display device 1 described above may be applied to the electronic imaging display system. In an imaging display device for vehicles, it is necessary to consider that a vehicle moves in high speed. That is, it is important in safe driving to minimize the time delay from imaging the object using the image sensor 22 to displaying the image in the display unit 40. If the imaging display device 1 described above is used, as in an electronic binocular or an electronic telescope, in accordance with the magnification that changes by optical zoom, the content of the aberration correction processing changes, and it is possible to minimize the time delay from imaging to displaying by deciding the phase difference TD according thereto.

5. Modification Examples

Each of the above embodiments can be variously modified. Specific modification examples will be illustrated hereinafter. Two or more embodiments randomly selected from the following examples can be suitably combined within the scope where the embodiments do not contradict each other. In addition, in a modification example described hereinafter, to avoid repeated description, the description of the common points with the above-described embodiment of the invention will be omitted.

Modification Example 1

In the embodiment described above, the display vertical synchronization signal DVsync is generated by delaying the imaging vertical synchronization signal SVsync by only the phase difference TD. However, the invention is not limited to this, and the imaging vertical synchronization signal SVsync may be generated by delaying the display vertical synchronization signal DVsync by only a phase difference TD'. In this case, if the duration of the frame cycle of the image signal D is Tx, TD'=Tx−Td. (Here, Tx is Fd.)

Figure 14:
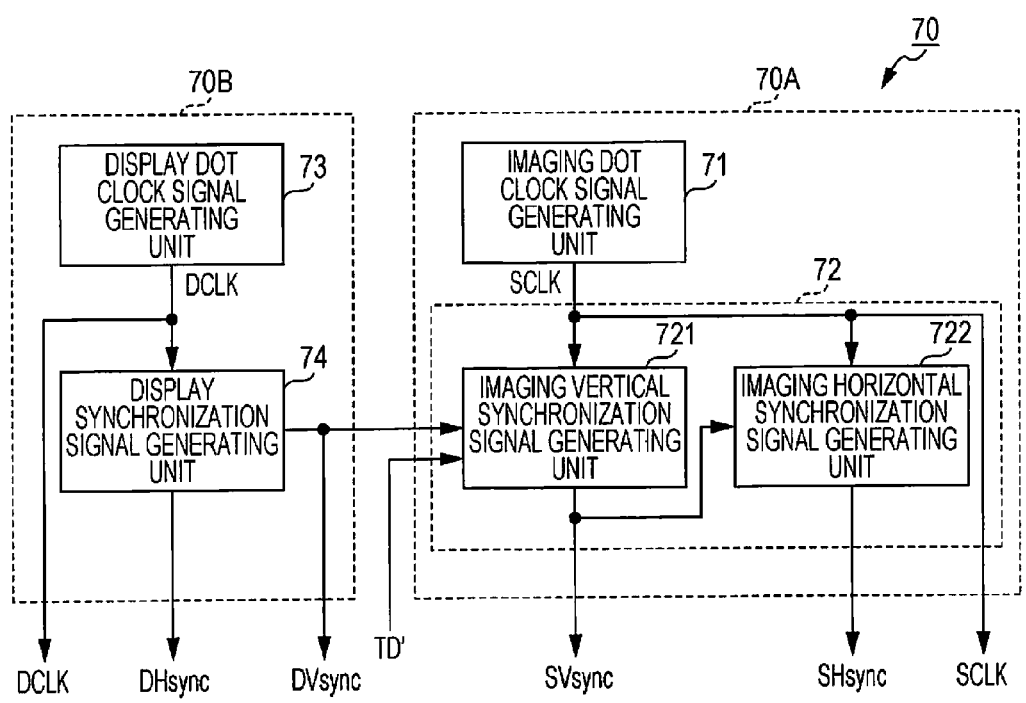
FIG. 14 is a block diagram illustrating the configuration of the timing control unit related to modification examples.

In addition, it is possible to configure the timing control unit 70 as illustrated in FIG. 14. The imaging horizontal synchronization signal generating unit 722 may generate one imaging horizontal synchronization pulse by counting the predetermined number of the imaging dot clock signal SCLK from the falling edge of the imaging vertical synchronization signal SVsync, and generate the imaging horizontal synchronization signal SHsync by repeating the above process.

Modification Example 2

In the embodiment and modification example described above, the CPU 50 determines the phase difference TD with reference to the phase difference table TBL. However, the invention is not limited to this, and any method in which the phase difference TD is determined based on the parameter related to the optical properties may be used. For example, the CPU 50 may determine the phase difference TD by computation. In this case, a computation expression may be prepared for each identifying data of the optical property data Docp and the phase difference TD may be computed by substituting the parameter related with the optical properties in the computation expression.

In addition, the CPU 50 is not needed to perform a determination by using the entire parameter related to the optical properties of the lens unit 10, but may determine the phase difference TD based on any one of the parameters.

Moreover, the CPU 15 of the lens unit 10 may determine the phase difference TD. In this case, the CPU 15 may generate the optical property data Docp including the phase difference TD as one of the parameters related to the optical properties, and transmit the optical property data Docp to the main body.

Modification Example 3

In the embodiment and modification examples described above, the case where the display unit 40 includes the liquid crystal panel 42 is illustrated. However, the invention is not limited to this embodiment and a display device including an organic light emitting diode (OLED) panel, a plasma display panel, or the like may be used.

Modification Example 4

In the embodiment and modification examples described above, the data transmission between the image signal generating unit 30 and the display unit 40 is performed by a parallel interface. However, the data transmission may be performed by high-speed serial interface of a low voltage differential (LVDS).

Modification Example 5

In the embodiment and modification examples described above, the display unit 40 is equipped in the imaging display device 1. However, the invention is not limited to this embodiment, and the display unit 40 may be configured to be a finder (display device) connected to the outside of a digital camera or the like.

This application claims priority to Japan Patent Application No. 2014-163281 filed Aug. 11, 2014 and Japan Patent Application No. 2015-104667 filed May 22, 2015, the entire disclosures of which are hereby incorporated by reference in their entireties.

What is claimed is:

1. An imaging display device comprising:
an imaging sensor that outputs a first imaging signal obtained by imaging an object through a lens unit at a timing based on an imaging vertical synchronization signal;
an image signal generator that generates a second image signal based on the first imaging signal;
a display that displays an image based on the second image signal at a timing based on a display vertical synchronization signal;
a memory that stores a phase difference table including an identifying data of the lens unit and a value of phase difference from the image vertical synchronization signal to the display vertical synchronization signal such that the identifying data and the value of the phase difference are associated to each other, the value of the phrase difference being a value that is determined in advance in association with the identifying data;
a processor that determines by the value of the phase difference by referring to the phase difference table based on the identifying data; and
a timing controller that generates the imaging vertical synchronization signal and the display vertical synchronization signal having a time difference according to the value of the phase difference determined by the processor from the imaging vertical synchronization signal.

2. The imaging display device according to claim 1,
wherein the lens unit outputs optical property data indicating parameters related to the lens unit, and
wherein the processor determines the value of the phase difference based on the optical property data obtained from the lens unit.

3. The imaging display device according to claim 2,
wherein the lens unit is detachable from a main body,
the parameters related to the optical property data include the identifying data,
wherein the image signal generator performs aberration correction processing in which aberration of the lens unit is corrected in accordance with the optical property data, and
wherein the processor determines the value of the phase difference in consideration of the time required for the aberration correction processing.

4. The imaging display device according to claim 2,
wherein the parameters related to the optical property data include at least one of zooming rate data that indicates zooming rate and focal length data that indicates focal length,
wherein the image signal generator performs aberration correction processing in which aberration of the lens unit is corrected in accordance with the optical property data, and
wherein the processor determines the value of the phase difference in consideration of the time required for the aberration correction processing.

5. The imaging display device according to claim 1,
wherein the timing controller delays, after generating the imaging vertical synchronization signal, the imaging vertical synchronization signal by only the value of the phase difference, and generates the display vertical synchronization signal, and supplies the imaging vertical synchronization signal to the imaging sensor while supplying the display vertical synchronization signal to the display.

6. The imaging display device according to claim 1, wherein
the memory stores the phase difference table that associates a type of the lens unit with the value of the phase difference.

7. The imaging display device according to claim 6, wherein
the memory stores the phase difference table that further associates the type of the lens unit with a plurality of focus lengths each of which is associated with the value of the phase difference, and
the processor obtains the phase difference from the memory based on the type of the lens unit and one of the focus lengths.

8. A control method of an imaging display device comprising:
outputting a first imaging signal obtained by imaging an object through a lens unit at a timing based on an imaging vertical synchronization signal;
generating a second image signal based on the first imaging signal;
displaying an image based on the second image signal at a timing based on a display vertical synchronization signal;
storing, in a memory, a phase difference table including an identifying data of the lens unit and a value of phase difference from the image vertical synchronization signal to the display vertical synchronization signal such that the identifying data and the value of the phase difference are associated to each other, the value of the phrase difference being a value that is determined in advance in association with the identifying data;
determining the value of the phase difference by referring to the phase difference table based on the identifying data; and
generating the imaging vertical synchronization signal and the display vertical synchronization signal having a time difference according to the value of the phase difference, which has been determined, from the imaging vertical synchronization signal.

* * * * *